C. ALVORD.
Firkins.
No. 141,847.  Patented August 19, 1873.
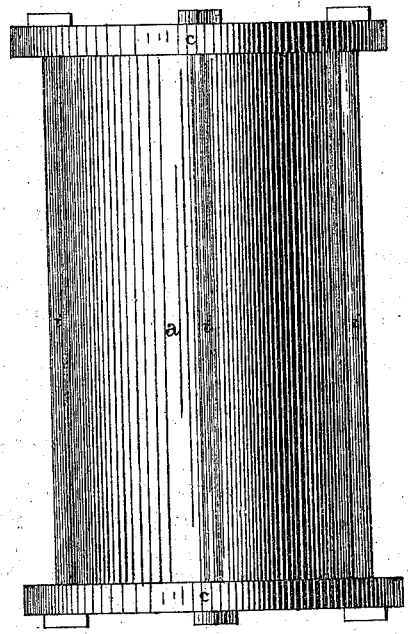
Witnesses.
A. K. Duhamel
A. S. Davidson.
Inventor.
Clark Alvord
Per H. S. Abbot.
Attorney.

UNITED STATES PATENT OFFICE.

CLARK ALVORD, OF WESTFORD, WISCONSIN.

IMPROVEMENT IN FIRKINS.

Specification forming part of Letters Patent No. 141,847, dated August 19, 1873; application filed March 17, 1873.

*To all whom it may concern:*

Be it known that I, CLARK ALVORD, of Westford, county of Dodge and State of Wisconsin, have invented certain new and useful Improvements in Firkins, of which the following is a specification:

The nature of my invention relates to an improvement in firkins; and consists in a cylinder, of any suitable material, clamped between two wooden heads by means of rods or nuts, or their equivalents, so as to form a barrel, cask, or firkin, for storing away materials of all kinds, or for transporting them from one place to another.

The accompanying drawing represents a side elevation of my invention.

$a$ represents a cylinder or vessel, of any required shape or size, and made from earthenware, glass, wood, metal, or any suitable material, and which is held between the two wooden heads $c$ by means of the rods $i$. Each of these heads has a circular groove cut in its inner side, so as to receive the cylinder and make a tight joint. The heads project out beyond the cylinder and form edges, on which the cask may be freely rolled from one place to the other, and thus save the necessity of carrying it during transportation.

This article makes a very desirable firkin for butter; or it may be used as a barrel or cask for storing away liquids or solids of all kinds. It is especially adapted for transportation, being strong and compact, and very readily handled.

Having thus described my invention, what I claim as new, and desire to secure by Letters Patent, is—

The cylinder $a$, heads $c$, and rods $i$, or their equivalents, substantially as described.

In testimony that I claim the foregoing as my invention I hereunto affix my signature this 11th day of March, 1873.

CLARK ALVORD.

Witnesses:
H. B. CONVERSE,
H. H. WILLIAMS.